(12) United States Patent
Fortusini et al.

(10) Patent No.: US 8,998,507 B2
(45) Date of Patent: Apr. 7, 2015

(54) FIBER OPTIC CONNECTORS AND STRUCTURES FOR OPTICAL FIBERS AND METHODS FOR USING THE SAME

(75) Inventors: Davide Domenico Fortusini, Ithaca, NY (US); Micah Colen Isenhour, Lincolnton, NC (US); Dennis Michael Knecht, Hickory, NC (US); James Phillip Luther, Hickory, NC (US)

(73) Assignee: Corning Incorporated, Corning, NY (US)

( * ) Notice: Subject to any disclaimer, the term of this patent is extended or adjusted under 35 U.S.C. 154(b) by 516 days.

(21) Appl. No.: 13/023,762

(22) Filed: Feb. 9, 2011

(65) Prior Publication Data

US 2011/0194821 A1 Aug. 11, 2011

Related U.S. Application Data

(60) Provisional application No. 61/303,486, filed on Feb. 11, 2010.

(51) Int. Cl.
*G02B 6/36* (2006.01)
*G02B 6/38* (2006.01)
*G02B 6/32* (2006.01)

(52) U.S. Cl.
CPC ............ *G02B 6/3833* (2013.01); *G02B 6/3853* (2013.01); *G02B 6/325* (2013.01); *G02B 6/3834* (2013.01); *G02B 6/3849* (2013.01); *G02B 6/3858* (2013.01)

(58) Field of Classification Search
None
See application file for complete search history.

(56) References Cited

U.S. PATENT DOCUMENTS

| | | | |
|---|---|---|---|
| 3,476,414 A | 11/1969 | Condrac | |
| 3,946,467 A | 3/1976 | Lukas et al. | |
| 4,032,118 A | 6/1977 | Phillips | |
| 4,534,616 A * | 8/1985 | Bowen et al. | 385/79 |
| 4,718,744 A * | 1/1988 | Manning | 385/79 |
| 5,152,556 A | 10/1992 | Holland et al. | |
| 6,302,595 B1 * | 10/2001 | Vilgiate et al. | 385/88 |
| 6,779,929 B1 * | 8/2004 | Savage, Jr. | 385/92 |
| 7,539,383 B2 * | 5/2009 | Sendai et al. | 385/128 |
| 7,542,644 B2 * | 6/2009 | Tanaka et al. | 385/114 |
| 8,057,106 B1 * | 11/2011 | Zhovnirovsky et al. | 385/74 |
| 2009/0214165 A1 * | 8/2009 | Shimotsu et al. | 385/79 |
| 2011/0280522 A1 * | 11/2011 | Tamura et al. | 385/88 |
| 2011/0286698 A1 * | 11/2011 | Greenberg et al. | 385/33 |

FOREIGN PATENT DOCUMENTS

| | | |
|---|---|---|
| DE | 9017376 | 4/1992 |
| EP | 0890771 | 1/1999 |
| GB | 2028530 | 3/1980 |
| WO | 2006/019516 | 2/2006 |

* cited by examiner

*Primary Examiner* — Sung Pak
(74) *Attorney, Agent, or Firm* — Svetlana Short

(57) ABSTRACT

In one embodiment, a device comprises at least one ferrule having a bore, the bore extending from a rear of the ferrule toward a front of the ferrule, wherein the bore is sized to receive an optical fiber with a buffer at a rear end face of the ferrule, wherein the front end of the ferrule includes an optical component.

20 Claims, 12 Drawing Sheets

FIBER OPTIC CONNECTORS AND STRUCTURES FOR OPTICAL FIBERS AND METHODS FOR USING THE SAME

This application claims the benefit of priority of U.S. Provisional Application Ser. No. 61/303,486 filed Feb. 11, 2010.

BACKGROUND

1. Field

The disclosure is directed to fiber optic connectors along with other structures and methods for using the same. More specifically, the disclosure is directed to fiber optic connectors and other structures suitable for use with large core optical fibers and methods for using these connectors.

2. Technical Background

Optical fiber is increasingly being used for a variety of applications, including but not limited to broadband voice, video, and data transmission. Optical fibers may be formed from different types of materials such as plastic or glass depending on the application. Typically, plastic optical fibers (POF) have been used in short distance optical networks since they are relatively easy to terminate by untrained personnel. However, POF has limitations such as not being suitable for longer distance optical networks because of high attenuation and limited bandwidth. On the other hand, glass optical fiber has much wider bandwidth and lower attenuation, and is therefore more suited for use over long distances. However, terminating or connectorizing conventional glass optical fibers is more complicated than terminating POF because it usually requires special cleaving tools and/or stripping tools for preparing the optical fibers. Moreover, conventional terminations or splicing of glass optical fibers may require a skilled technician and/or specialized equipment. For instance, fiber optic connectors for conventional glass optical fibers typically have a fine polish on the end face of the ferrule holding the glass optical fiber that is best accomplished in a factory setting with dedicated equipment. Field-terminated optical fiber connectors having a mechanical splice are available to the craft but are not typically used for short distance optical networks even though they are suitable for these applications.

Thus, there is an unresolved a need for fiber optic connectors and other structures for use with glass optical fibers that are simple, cost-effective, reliable, easy to assemble, and which offer easy connection and disconnection for short distance optical fiber networks.

SUMMARY

Embodiments of the disclosure are directed to fiber optic connectors and other structures that can be easily and quickly prepared by the craft for termination and/or connectorization in the field. More specifically, at least in some embodiments, the fiber optic connectors and other structures disclosed are intended for use with glass optical fibers having a large core. Methods of using the fiber optic connectors and other structures are also disclosed. According to some embodiments, the methods disclosed allow "rough cutting" of the optical fibers with a buffer layer thereon, and optically coupling such fiber to another component, for example to a detector in a receiver or to a light source in a transmitter, or to another optical fiber.

According to some exemplary embodiments a device comprises a ferrule having a bore, the bore extending from a rear of the ferrule toward a front of the ferrule. The bore is sized to receive a buffered fiber (an optical fiber with a buffer layer thereon) at a rear end of the ferrule, and the front end of the ferrule includes an optical component. According to some embodiments the optical component is an optically transparent window or a lens.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 8A-1, 8A-2 and 8B are cutaway views of a ferrule according to another embodiment of the present invention, showing a fiber/buffer assembly inside the ferrule and a protruding structure in contact with the endface of the fiber;

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts.

The embodiments and methods described herein are suitable for making optical connections for optical networks. The concepts of the disclosure advantageously allow the simple, quick, and economical connection and disconnection of glass optical fibers.

Figure 1:
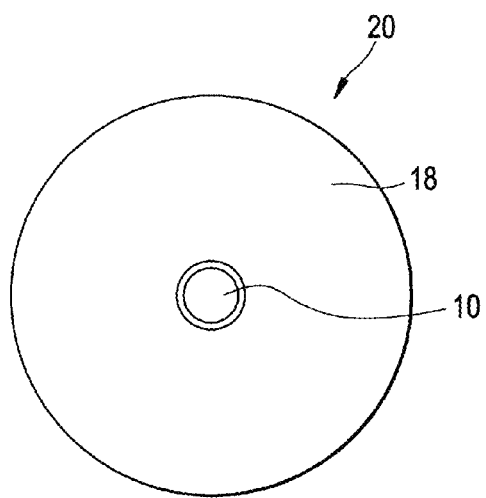
FIG. 1 is an end view of a large core optical fiber having a buffer layer after being "rough cut" for use in the fiber optic connectors disclosed herein.

FIG. 1 is an end view of an optical fiber 10 having a buffer layer 18 thereon, forming an optical fiber/buffer assembly 20 after being "rough cut" for use in the fiber optic connectors or other structures disclosed herein. Optical fiber 10 includes a large glass core with at least one thin cladding layer such as a plastic cladding layer, which is then protected with a protective coating as described in more detail herein. The cladding layer may also be glass, for example silica-based glass. Stated another way, according to some embodiments, the optical fiber 10 is a glass-based optical fiber such as a silica-based optical fiber. As used herein, "a large glass core" means the optical fiber has a core with a diameter of 80 microns or greater. Using optical fibers with large glass core aids in the alignment of the abutting optical fiber cores. In this embodiment, optical fiber 10 has a core with a diameter of about 200 microns and cladding that is about 15 microns thick. The protective coating of optical fiber 10 generally covers the cladding and is also relatively thin such as about 10 microns thick. A polyvinylchloride (PVC) buffer layer 18 upcoats optical fiber 10 and has an outer diameter of 1.5 millimeters, but other suitable materials and/or dimension are possible for the buffer layer. Moreover, optical fiber 10 preferably has a concentricity error with buffer layer 18 that is 20 microns or less. The construction of optical fiber 10 with buffer layer 18 is advantageous for short distance optical fiber networks or other applications due to the simplicity in preparing the same for connectorization. By way of example, special cleaving tools and/or stripping tools are not required for preparing optical fiber 10. Instead, optical fiber 10 and buffer layer 18 can be "rough cut" using a simple tool such as a common razor blade, for example in a single step. By way of example, the protective coating inhibits the core of optical fiber 10 from being pushed off center during the cutting process with a simple tool. Simply stated, the construction of the coating helps maintain the concentricity of optical fiber 10 with respect to buffer layer 18, thereby allowing a low-loss optical connection. Thus, preferably, the buffer layer remains on fiber during and after cutting, and does not need to be stripped.

Figure 2:
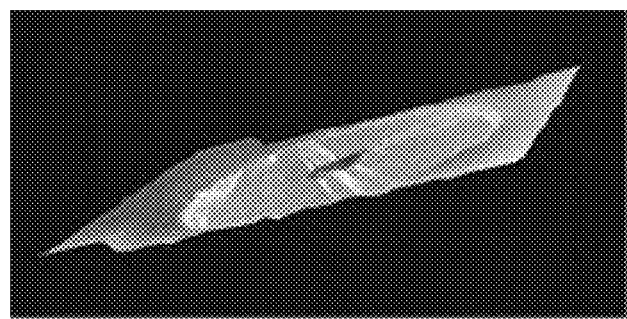
FIG. 2 is a contour representation of a "rough cut" optical fiber.
Figure 3A:
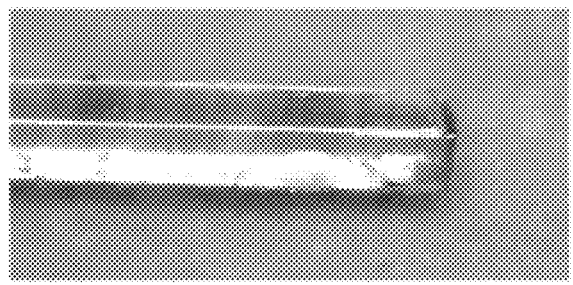
FIG. 3A depicts an optical fiber that was "rough cut" with a buffer layer disposed at the cut portion.
Figure 3B:
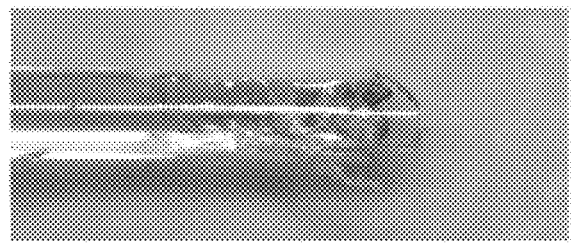
FIG. 3B depicts an optical fiber that was "rough cut" without a buffer layer disposed at the cut portion.

FIG. 2 shows a contour representation of "rough cut" optical fiber 10 using a Keyence microscope with surface profile capacity. Optical fiber 10 was cut using a common utility blade or razor blade, as opposed to a precision cleaver as would be used when terminating an optical fiber used in typical telecommunication optical network. The surface of optical fiber 10 is multifaceted as shown; however, it is not shattered. The construction of optical fiber 10 with buffer layer 18 allows "rough cutting." By way of example, FIGS. 3A and 3B depict a comparison between optical fiber 10 "rough cut" with buffer 18 thereon (FIG. 3A) and the optical fiber that was "rough cut" after the buffer layer was removed (FIG. 3B). Both optical fibers were "rough cut" with respective brand new utility blades. Buffer layer 18 has been removed from optical fiber 10 in FIG. 3A after the "rough cut" procedure, so the condition of optical fiber 10 thereunder can be viewed for comparison purposes with FIG. 3B. Specifically, FIG. 3A shows that optical fiber 10 is in relatively pristine condition compared with the optical fiber in picture B after "rough cutting". In other words, the optical fiber in FIG. 3B has more damage than the optical fiber 10 cut with the buffer layer 18 as shown in FIG. 3A. Fiber optic connectors and other structures disclosed herein use the rough cut optical fibers with the buffer layer 18 intact at the front end face of the optical fiber.

Simply stated, special tools and procedures are not required for connectorizing and/or splicing the rough cut optical fibers. Furthermore, the structures disclosed herein are also advantageous since they allow the use of high-quality glass optical fiber without requiring polishing to a fine finish as typically done for glass optical fibers having small optical fiber cores; however, the "rough cut" end face the optical fiber/buffer layer may be smoothed if desired. Consequently, an untrained person can quickly and easily make connections of suitable quality for optical networks while advantageously using glass optical fibers, instead, of using plastic optical fibers.

Figure 4A:
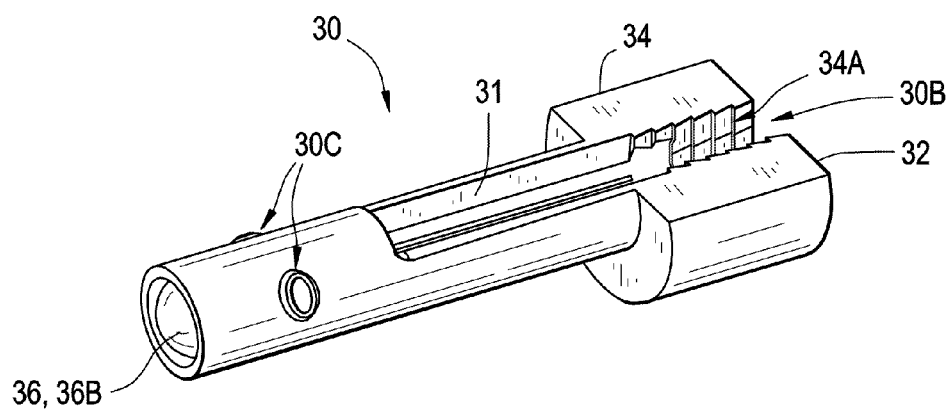
FIG. 4A depicts a ferrule according to one embodiment of the present invention.

FIG. 4A depicts a ferrule 30 according to one embodiment of the present invention. The ferrule 30 has a ferrule body 30A with an a "U"-shaped opening 31, enlarged finger "landing" area 34, which in this embodiment surrounds the fiber securing area 34A, and an optical component 36. The fiber securing area 34A may include fiber securing structure(s) such as ribs, serrations or any other structure that utilizes compression to indent into the buffer 18. For example, the fiber securing structure may include one or more protrusions (e.g., ribs, serrations, knobs or a roughened surface) applying compressive force into the buffer and preferably indenting into the outer surface of the buffer. The optical component may be, for example, a transparent window 36A which may be planar, or a lens, such as, for example, a collimating lens 36B. The area with the fiber securing structure forms a cavity or a channel that is big enough that a fiber/buffer assembly 20 can be inserted, pressed or squeezed by hand into the securing area. The ferrule may also include an optional protruding structure, such as for example a truncated conical or cylindrical pedestal 38 (not shown), for better coupling between the fiber and the optical component 36 (e.g., an optically transparent window 36A or lens 36B). Preferably, the protruding structure is optically transparent and forms a part of optical component 36. The ferrule may contain index matching material, such as gel 37 (not shown) or a pad. This material is preferably situated inside the bore, preferably proximate to said optical component, more preferably on the inner (fiber facing side) of the optical component 36. The gel has substantially the same index of refraction as the fiber's core, for example, greater than 1.0, preferably between 1.3 and 1.6 and more preferably between 1.4 and 1.5. An example of a common index-matching material is a low-viscosity index polymer with a molecular weight typically less than 30,000 Daltons to which is added a small amount of gelling agent, such as fumed silica or metal soap to make the gel phixotropic. Such materials are popular because they are inexpensive and do not require significant technical expertise to manufacture. The entire ferrule 30 may optionally be made from optically transparent material, such as an optical quality plastic, such as Ultem 1010 available from Sabic Innovative Plastics, and can be monolithic. The body 30A includes bore 30B sized to receive the optical fiber 10 and buffer layer 18 at a rear end face 32 of the ferrule 30. In other words, ferrule 30 has a bore 30B that extends from a rear of the ferrule towards a front (i.e., the front end face) of the ferrule 30 where the bore 30B is sized to receive the rough cut optical fiber 10 with the buffer layer 18 at the rear end face 32 of the ferrule 30. The bore 30B extends from the rear of the ferrule towards the front of the ferrule and terminates at the optical component 36. The bore 30B of ferrule 30 has a diameter of 250 microns or greater at the rear end face 32, but ferrules can have any suitable sized bore that is matched to the outer diameter of the buffer layer surrounding the optical fiber. Illustratively, the bore 30B of ferrule 30 has a diameter slightly larger than 1.5 millimeters for receiving optical fiber 10 and buffer layer 18 having the outer diameter of 1.5 millimeters at the rear end face 32. By way of example, other suitable bore sizes at the rear end face 32 are 900 microns, 700 microns, 500 microns, but other sizes matched to the outer diameter of the buffer layer are possible. The "U" opening 31, allows the fiber 10 with buffer layer 18 to be inserted into the ferrule 30 through the "U" opening 31 and pushed into the front portion of the bore, so that the endface of the buffered fiber is in contact or in proximity (within 50 μm) of the inside face of the optical component 36. The fiber/buffer assembly 20 is pushed into the fiber securing area 34A so that the buffered fiber is retained securely within the ferrule. The optical component 36, such as for example a lens 36B, provides efficient optical coupling between the fiber and an optical transmitter or receiver, or other device mated to the ferrule 30. The protruding structure (e.g. truncated conical pedestal 38) may be a part or surface of optical component 36 and improves the ability of the fiber 10 to be in contact with the optical component 36, such as optically transparent window 36A or lens 36B. The optical component 36 (for example the lens 36 B) may form a permanent part of the ferrule 30, but may also be detachable. For instance, ferrule 30 may include lens cap 295 (that includes the lens 36B) attached to the same. Lens 36B may act as a stop for optical fiber/buffer assembly 20 insertion as discussed. Further, lens cap 295 may be preloaded with an index-matching gel so that when the optical fiber 10 abuts lens 36B the same index-matching gel is applied to an end face of the same. If the lens cap 295 is detachable from the ferrule 30, the lens cap 295 is preferably secured or fastened to ferrule 30. Consequently, when inserting the optical fiber/buffer assembly 20 to the proper location abutting the lens 36B, the lens 36B is inhibited from being unintentionally displaced.

In this embodiment, the bore portion corresponding to the securing area 34 includes a retaining structure such as ridges 34A that allow the fiber fiber/buffer assembly 20 to easily slide through the rear end face 32 of the ferrule 30 to the front end of the ferrule bore, but does not permit it to slide in the opposite direction, out of the ferrule 30. More specifically, when compressed, the retaining structure 34A grips the buffer layer 18, thus securing fiber/buffer assembly 20 in place. The outer surface of the ferrule 30 may include one or more optional features, such as plurality of protrusions 30C that engage with mating features of the receptacle 110B of the active device 100. That is, mating features of the receptacle 110B engage with the corresponding features on the outer surface of ferrule 30.

Figure 4B:
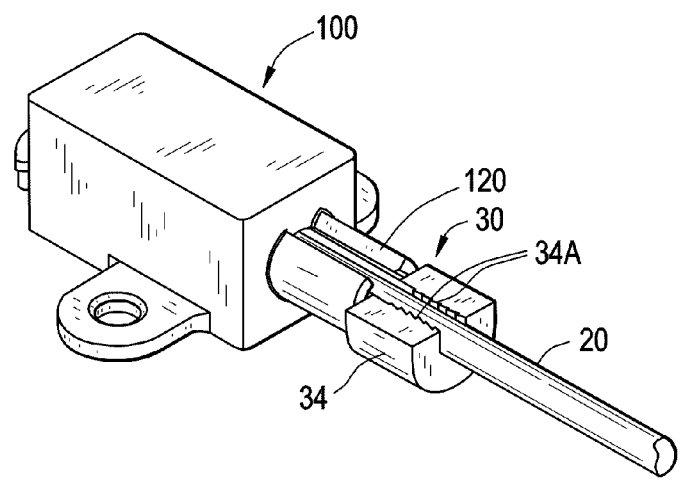
FIG. 4B illustrates the ferrule of FIG. 4A with the inserted optical fiber/buffer assembly, inserted into an active device.

FIG. 4B illustrates the ferrule 30, with the inserted optical fiber/buffer assembly 20, inserted into an active device 100. In this embodiment, the active device is a transceiver, receiver or transmitter 110 having a body 110A with a mating receptacle 110B. When the ferrule 30 with the inserted optical fiber/buffer assembly 20 is inserted into an active device, the mating receptacle 110B of the active device 100 acts as a clamping structure by exerting inwardly applied pressure and thus biases the two sides of the "U" shaped opening toward each other (as shown by the two arrows). Thus, the fiber/buffer assembly 20 is secured by the pressure extended within the opening.

Figure 5A:
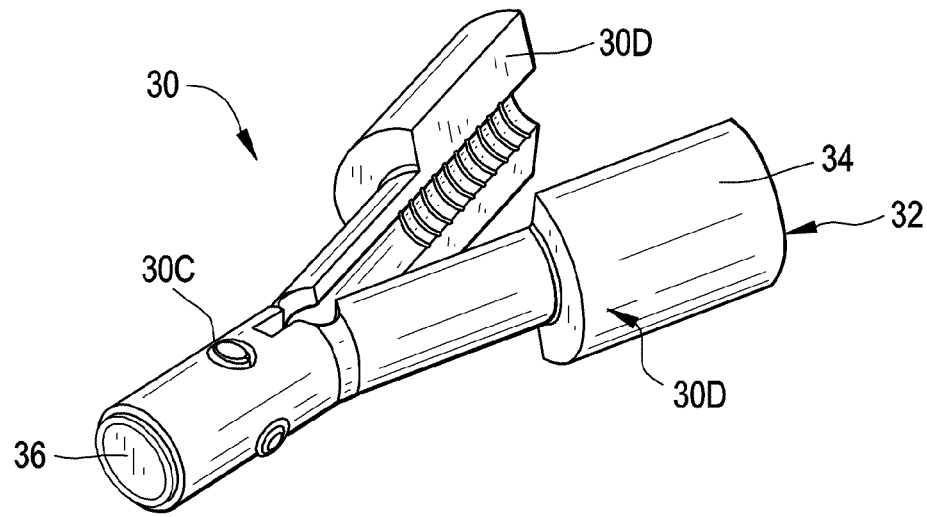
FIGS. 5A and 5B depict another embodiment of the ferrule.
Figure 5B:
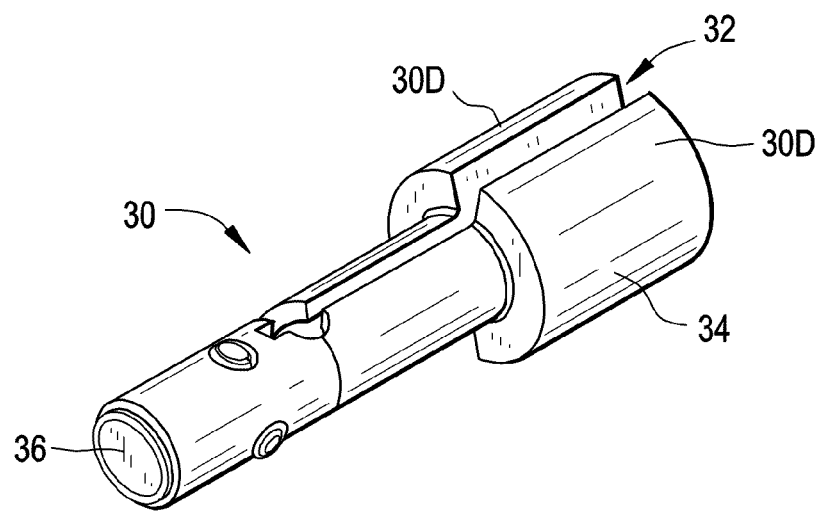

FIG. 5A depicts another embodiment of the ferrule 30. The connector ferrule 30 of this embodiment is a split ferrule, which can be opened to receive fiber/buffer assembly 20, or closed to secure the fiber/buffer assembly 20 inside the ferrule 30. The ferrule 30 comprises a rear portion, which is split in two (or more) arms 30D, and a front portion, which is not split. The transition between rear and front portion comprises a relatively flexible section, such as a thin plastic that can flex, to allow the rear portion to be opened. Rear portion is shown open in FIG. 5A and closed in FIG. 5B. Rear portion also includes finger landing region 34. Retaining structure 34A of body 30A, as shown, is situated in one or more cantilevered arms. The retaining structure 34A is biased together onto the optical fiber/buffer assembly 20 using a suitable structure, described below.

Figure 6A:
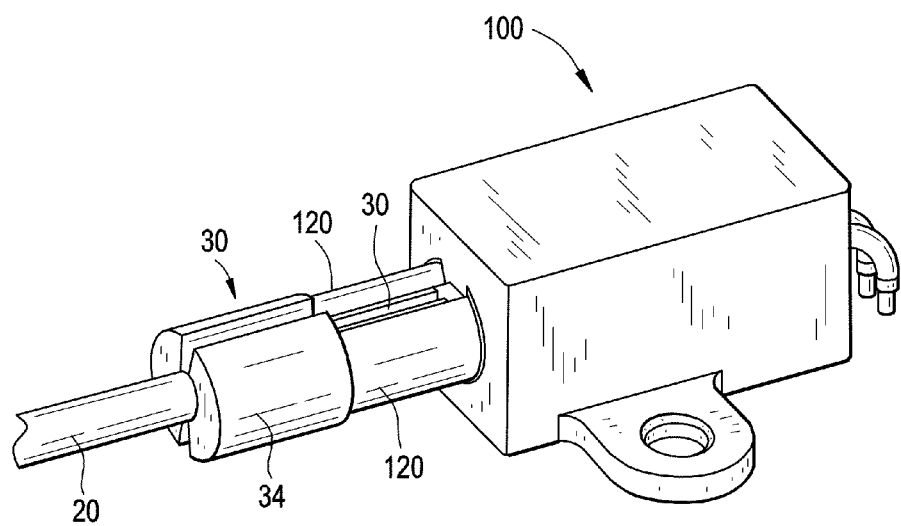
FIG. 6A illustrates the ferrule of FIGS. 5A and 5B, with the optical fiber/buffer assembly, inserted into an active device.

FIG. 6A illustrates the split connector ferrule 30 (with the optical fiber/buffer assembly 20) being inserted into an active device 100. In this embodiment, the active device is a transceiver, transmitter, or receiver 110 having a body 110A with a mating receptacle 110B (not shown) and optional guiding arms 120. When the ferrule 30 with the inserted optical fiber/buffer assembly 20 is inserted into an active device, the mating receptacle 110B (not shown) and/or the optional guiding arms 120 of the active device 100 acts as a clamping structure by exerting inwardly applied pressure and thus biases the two or more arms 30D toward each other (as shown by the two arrows). Thus, the fiber/buffer assembly 20 is secured by the pressure by the arms 30D of the split ferrule, which are pressed together by receptacle 110B and/or the guiding arms 120 of the body 110A of active device 110.

The active device 100 also includes an electro-optic component 125, for example an optical source 125A (in case active device is a transmitter) or a photodetector 125B (in case active device is a receiver). The active device 100 may also include an optional optical component such as a lens 130. The optical components 130 and 36 are preferably designed so to provide efficient coupling between the fiber 10 and the electro-optic component 125. For example, if the active device is a receiver, optical component 36 can be a lens 36B that collimates the optical output of the fiber 10 and provides it to the lens 130, which focuses it on the photodetector 125B. Alternatively, if the active device is a transmitter, optical component 130 can be a lens that collimates the optical output of optical source 125A and provides it to lens 36B, which focuses it on the fiber 10. It is noted that the light between optical component 130 and lens 36B does not need to be collimated. Alternatively, if the active device 100 does not include the optical component such as a lens 130, lens 36B can be designed to directly couple the light between the fiber 10 and the electro-optic component 125. Also alternatively, if the ferrule 30 includes a planar window 36A the lens 130 can be designed to directly couple the light between the fiber 10 and the electro-optic component 125.

Figure 6B:
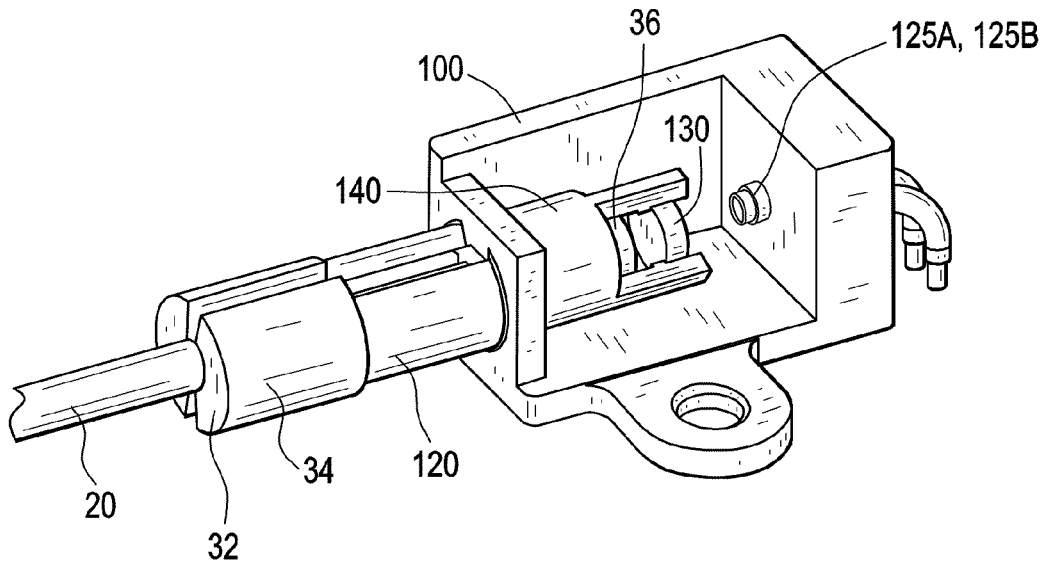
FIGS. 6B and 6C are cutaway views of the active device of FIG. 6A.
Figure 6C:
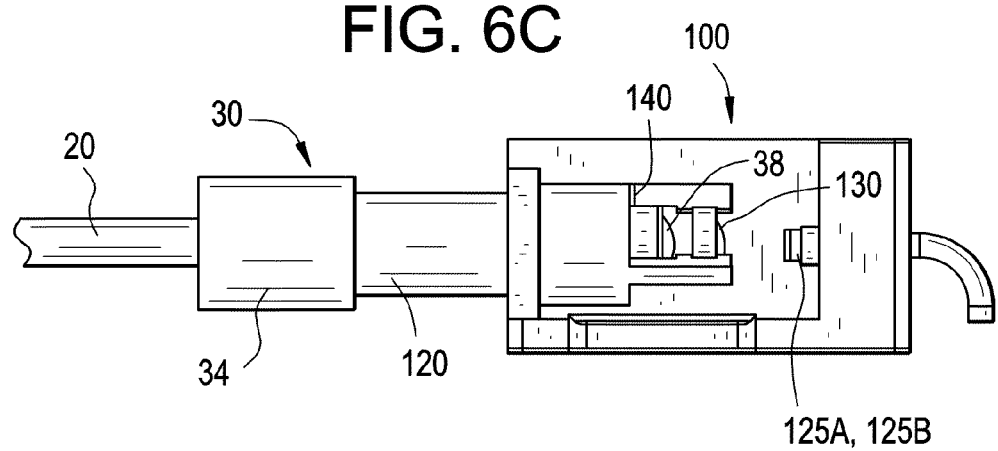

FIGS. 6B and 6C are cutaway views of FIG. 6A showing active device 100. Mating receptacle 110B can be formed within the body of active device 100, or alternatively can be formed as part of a guiding mechanism 140 situated proximate to guiding arms 120. The receptacle 110B may include a guiding cylinder 145 for guiding the ferrule 30 and supporting optical component 130, as well as an optional stopping feature to stop the ferrule at the desired location when the ferrule is inserted inside active device, so that the optical component 36 and 130 are spaced from each other by the desired distance.

Figure 6D:
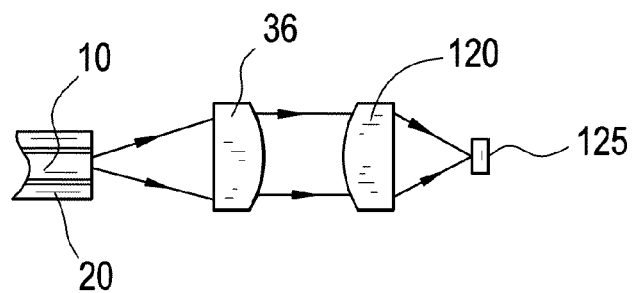
FIG. 6D illustrates an optical coupling arrangement between a fiber and a photodetector according to one embodiment of the present invention.

FIG. 6D illustrates an exemplary optical design according to one embodiment of the present invention. More specifically, the light emitted by fiber 10 is collimated by lens 36B, which provides it to lens 130. Lens 130 focuses the light on photodetector 125A.

Figure 7A:
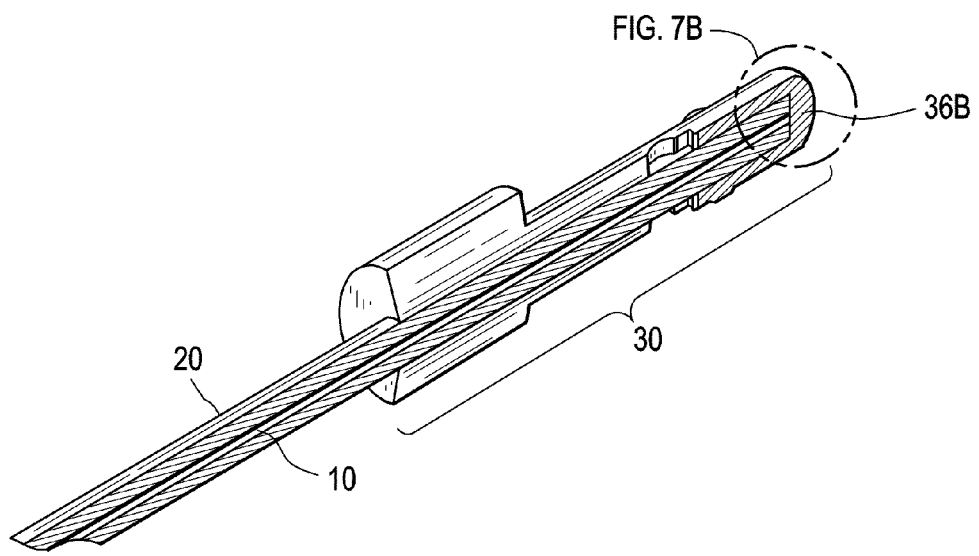
FIG. 7A is a cutaway view of the ferrule of FIGS. 5A and 5B, showing a fiber/buffer assembly inside a ferrule.
Figure 7B:
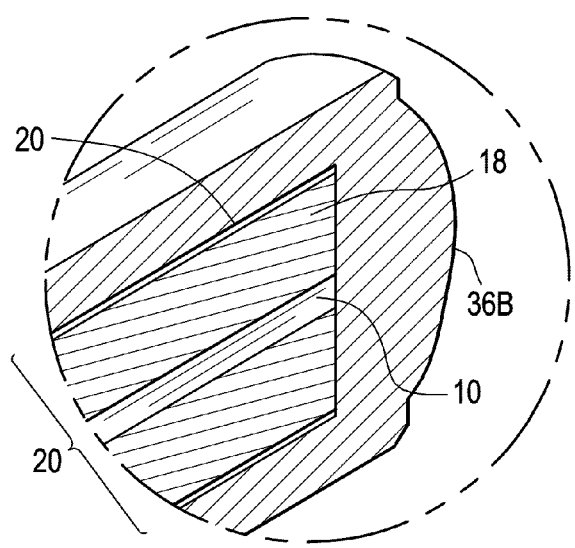
FIG. 7B is an expanded view of end portion of the end portion of the ferrule of FIG. 7B.

FIGS. 7A and 7B are cutaway views of split ferrule and display an expanded view of front end of ferrule 30 showing fiber/buffer assembly 20 inserted into ferrule 30. In this embodiment the ferrule is made of optically transparent plastic and the end of the bore 30B at the front end of the ferrule is flat, with an opposing curved surface to form a lens 36B. Index matching material, such as gel 150 can be used in front end of the bore of the ferrule, between the endface of the fiber 10 and the surface of the optical component 36, which in this embodiment is the planar surface of the lens 36B. The index matching material helps to reduce optical loss between fiber 10 and lens 36B. In particular, if the fiber endface is rough the index-matching gel provides a relatively smooth surface on the fiber endface, and therefore reduces scattering and thus reduces the optical loss.

For example, after the cutting or cleaving step, the cut face of the fiber has a peak to valley (P-V) flatness of less than 200 µm, preferably less than 50 µm, for example between 0.5 µm and 35 µm, or between 1 µm and 30 µm. If cleaved, the fiber may be cleaved with a diamond blade, and for example, the cleaved fiber preferably has hackle of less than 20% of area of endface, more preferably less than 5%, for example between 0.5% and 5%.

Figures 1, 8A:
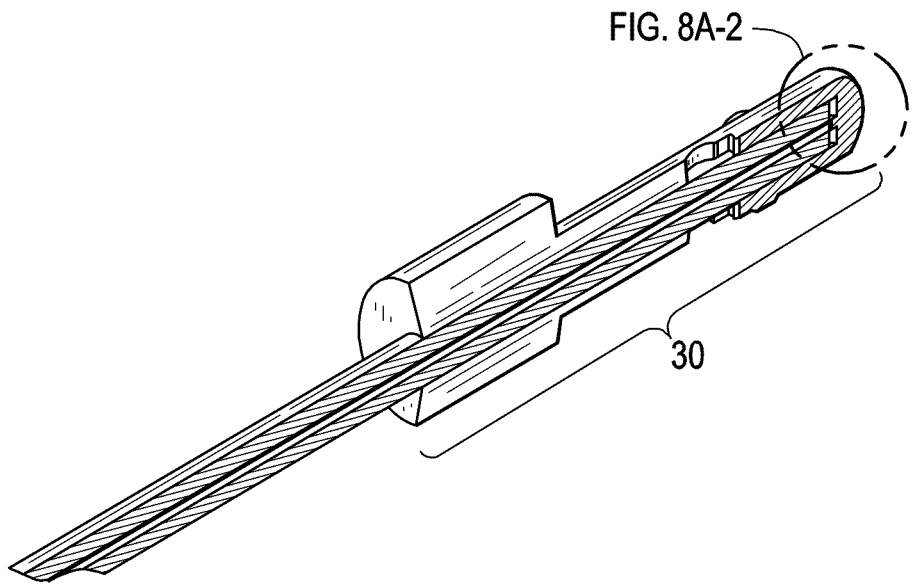
Figures 2, 8A:
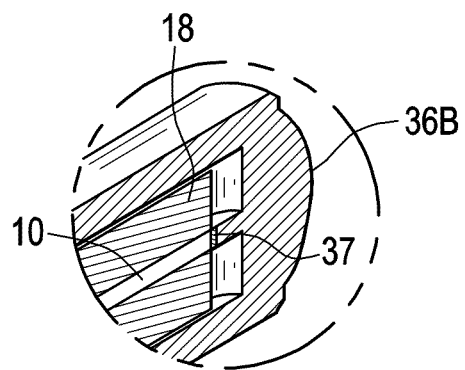
Figure 8B:
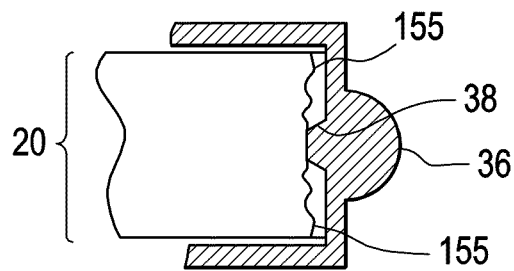

FIGS. 8A-1 and 8A-2 and 8B are a cutaway views of the split ferrule and an expanded view of the front end of the ferrule showing the buffered fiber inserted into the ferrule. In this embodiment the front end of the bore of the ferrule includes a protruding structure, e.g. a truncated conical pedestal 38. This design improves ability of fiber 10 to become in direct contact with the front end of ferrule bore as shown in FIG. 8B, where fiber is in close proximity (within 50 µm, e.g., 0 to 49 µm) of, or butting against, the truncated conical pedestal. The recessed area 155 provides a place for excess gel and other debris to collect and prevents potential protrusions on endface of buffer 18 from causing a gap between fiber 10 endface and front end of bore of ferrule. The truncated pedestal has a flat surface, and together with the opposing curved surface it forms the lens 36B. Index matching material is preferably used in the front end of the bore of the ferrule to reduce optical loss between fiber and the lens 36B.

Figure 9A:
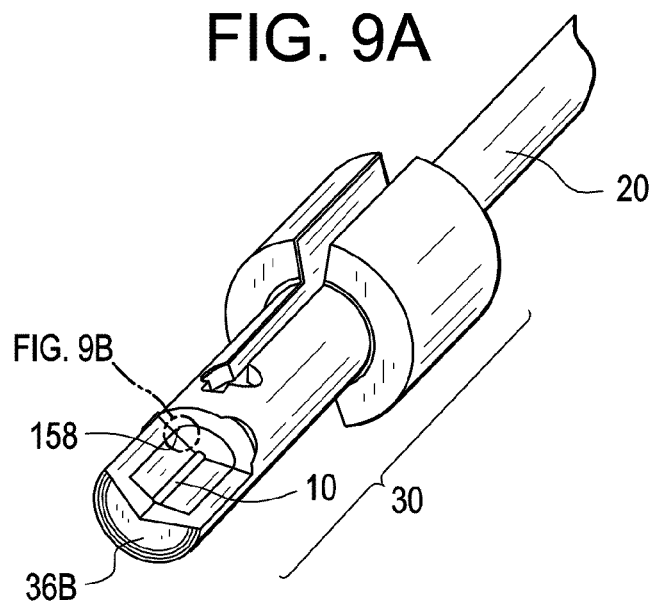
FIG. 9A illustrates another embodiment of the present invention where the ferrule includes a centering structure for centering the fiber/buffer assembly inside the ferrule.
Figure 9B:
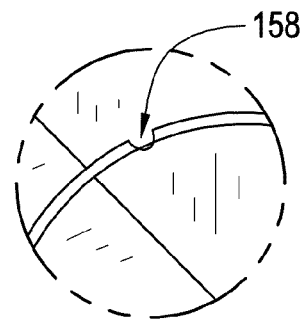
FIG. 9B illustrates an expanded view of a portion of the embodiment of FIG. 9A.

FIG. 9A and FIG. 9B show an embodiment where fiber/buffer assembly centering structure, for example protruding stricture(s) such as ribs 158 are added to the inside surface of the ferrule bore 30B. These ribs function to center the buffered fiber 20 more accurately for a larger range of buffer diameters than a purely circular bore as the ribs 158 indent into compliant buffer 18. In addition, the ribs 158 maintain a gap 156 between the circumference of buffered fiber and the ferrule bore, providing a route for excess gel to escape so that excess gel is not trapped between the endface of the fiber 10 and the front end of the bore of the ferrule 30. Thus ferrule may comprise protruding structures situated on a surface of the bore that help to center the fiber (because the compliant buffer will yield under pressure), and a space for some of the index-matching material (e.g., gel) to escape by moving around the fiber end.

Figure 10:
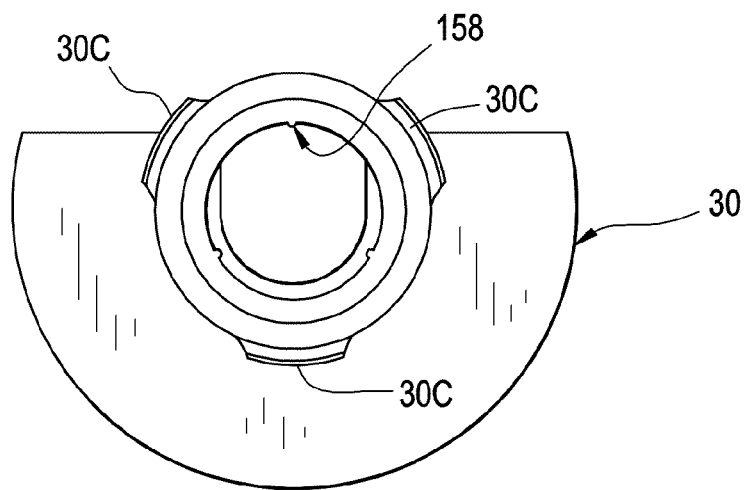
FIG. 10 shows an end view of the ferrule of FIGS. 9A and 9B.

FIG. 10 is a detail end view of ferrule of FIGS. 9A and 9B showing three ribs 158 around circumference of bore. The ferrule 30 may optionally have an outer surface with mating features (bumps) engaging the mating features (e.g., dimples or groove) on the internal surface of the active device. For example, FIG. 10 also illustrates a plurality of protrusions 30C that engage with mating features of the receptacle 110B (not shown).

Figure 11:
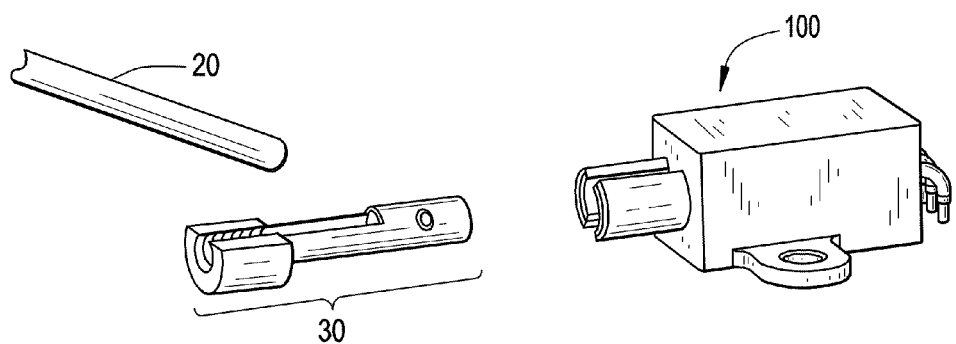
FIGS. 11 through 14 illustrates a method of connecting a buffered fiber to an active device.
Figure 12:
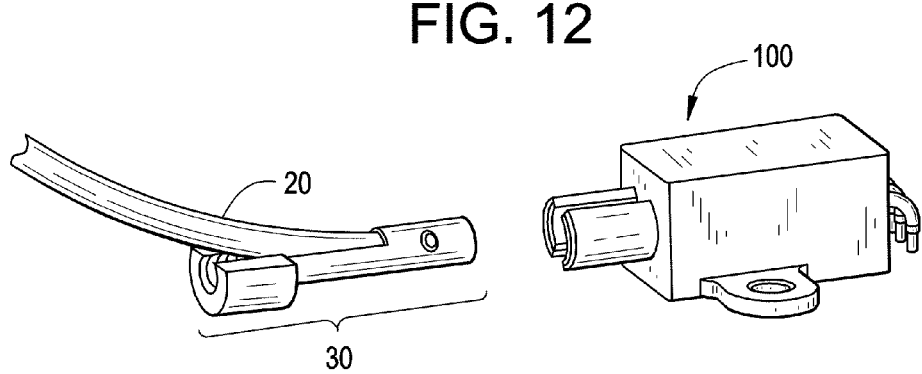
Figure 13:
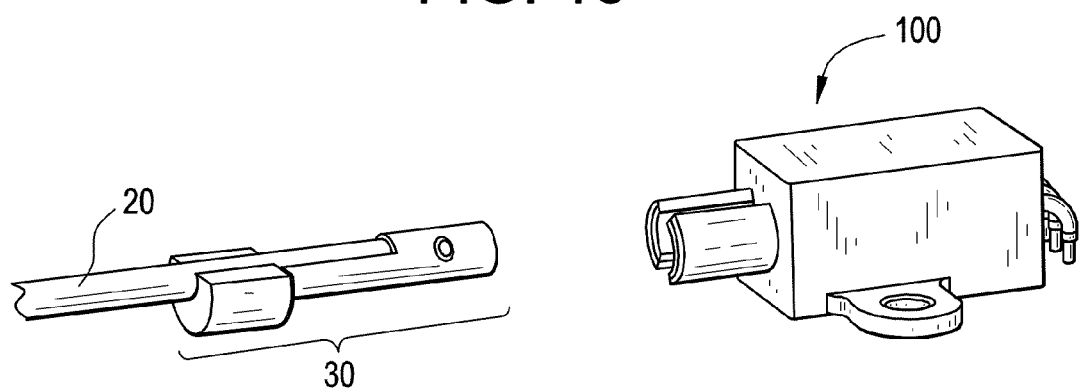
Figure 14:
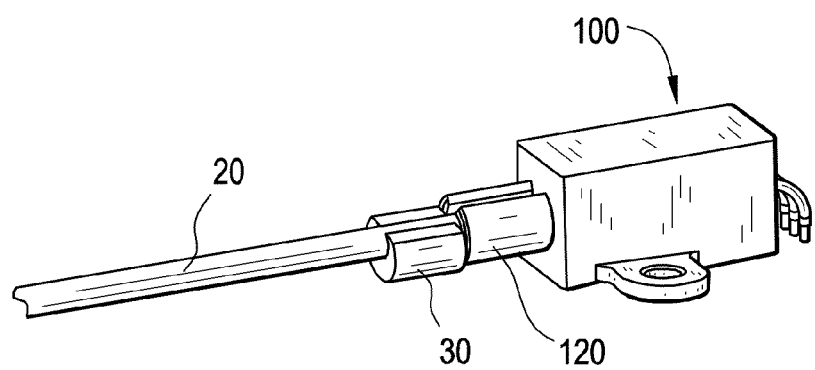

FIGS. 11-14 illustrate a method for connecting a buffered fiber (fiber/buffer assembly 20) to the active device 100. More specifically, FIG. 11 shows several components prior to assembly, including a fiber/buffer assembly 20, an exemplary ferrule 30 with a "U" opening 31, and an active device 100 (for example a transmitter, or receiver) with the optional guiding arms 120. The ferrule 30 may be preloaded with index matching material (closely approximating the index of refraction of the fiber core), such as index matching gel. FIG. 12 illustrates that buffered fiber is inserted into ferrule 30, for example via the U shaped opening, until it contacts optical component 36 at the front end of bore of ferrule 30. For example, this can be done manually by squeezing the fiber into the opening by hand while holding the ferrule by hand at the finger "landing" area 34. In FIG. 13 the fiber is shown pressed into "U"-shaped opening and is fully loaded into the ferrule. The ferrule 30 is now loaded with the buffered fiber (fiber/buffer assembly 20) and can be inserted into the optional guiding arms 120 and then pushed deeper into the receptacle 110B of the active device 100. FIG. 13 illustrates buffered fiber/ferrule assembly ready to be inserted into the active device 100, while FIG. 14 illustrates the ferrule loaded with the buffered fiber fully inserted into the active device 100.

Similarly, when using a ferrule with a split configuration, the ferrule 30 may be preloaded with index matching material. The buffered fiber is inserted into ferrule 30 while the ferrule arms are in the open position until it contacts the optical component 36 at the front end of bore of ferrule 30. Thus, for example, the optical fiber/buffer assembly can be inserted by hand into the ferrule. The ferrule 30 loaded with the buffered fiber (fiber/buffer assembly 20) can be then inserted into the optional guiding arms 120 and then pushed into the receptacle 110B of the active device 100. The receptacle of the active device provides the force to keep the arms together, retaining the fiber in the locked position.

Accordingly, a method of connecting a fiber to an active device may include the steps of:
1) Providing a fiber/buffer assembly 20
2) Providing a ferrule 30
3) Inserting the fiber/buffer assembly into the ferrule 30;
4) Inserting the ferrule into the mating receptacle of the active device 100.

In some embodiments the method also includes cutting or cleaving a fiber buffer assembly while the buffer surrounds the fiber; and inserting the fiber/buffer assembly into a ferrule such that the cut or cleaved endface of the optical fiber is situated adjacent to at least one surface of the optical component. The method may also include the step of inserting index-matching material into the ferrule, so that index-matching material is situated in contact with the endface of the optical fiber.

Alternatively ferrule 30 could be preinstalled into transceiver 100, or could be built into transceiver. For example the ferrule 30 may be designed to be a part of active device 100 and may be optionally removable so that it can be replaced, or cleaned, or loaded with index-matching material. For example, a split-arm ferrule can form a part of the active device and the arms can be locked in the closed position after the fiber has been inserted via an external ring inserted on the outer surface of the arms of the ferrule. Examples of other suitable locking structures include a camming feature or other suitable structure for securing the optical fiber in the ferrule. In some embodiments, the retaining/securing structure may be reversible, that is, the retention may be undone in case the optical fiber requires repositioning. For instance, the cam feature may be reversed to unclamp the optical fiber for repositioning the same within the fiber optic connector.

Figure 15:
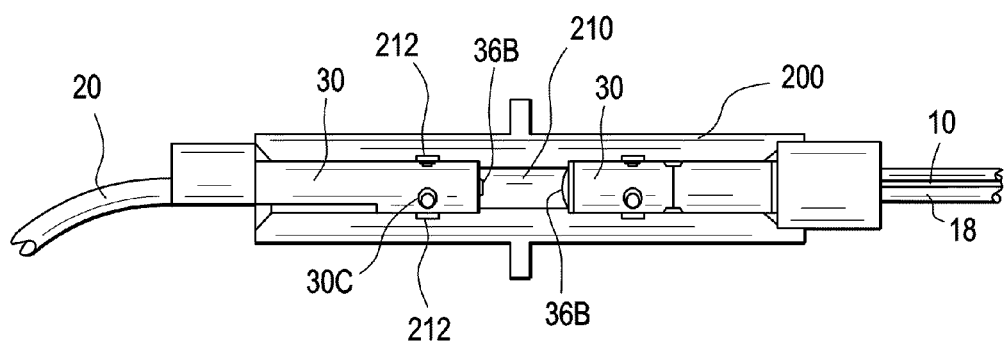
FIG. 15 illustrates two ferrules used in conjunction with a ferrule connector to provide optical coupling between two fibers, according to one embodiment of the present invention.

A different application of ferrule 30 is to utilize one or more ferrules to provide optical coupling between two optical fibers. For example, as shown in FIG. 15, two ferrules with the optical fibers situated therein can be placed in proximity of each other such that optical component 36 of first ferrule faces optical component 36 of second ferrule. In one exemplary embodiment, the light is provided by the first fiber 10 to the lens 36B of the first ferrule 30. The lens 36B of the first ferrule collimates the light and provides it to the lens 36B of the second ferrule 30; the lens 36B of the second ferrule 30 then focuses the light on the endface of the second fiber 10. Accordingly the light is coupled from the first fiber to the second fiber via the two lenses 36B. The two lenses 36B are kept in optical alignment with one another by having the ferrules 30 situated in a retaining device such as a ferrule connector 200. The ferrule connector 200 has an internal bore (mating receptacle) 210 for receiving the ferrules and situating them in optical alignment with one another. The internal bore 210 may have mating structures 212 for engaging and securely holding the ferrules 30 inside the ferrule connector 200.

Figure 16:
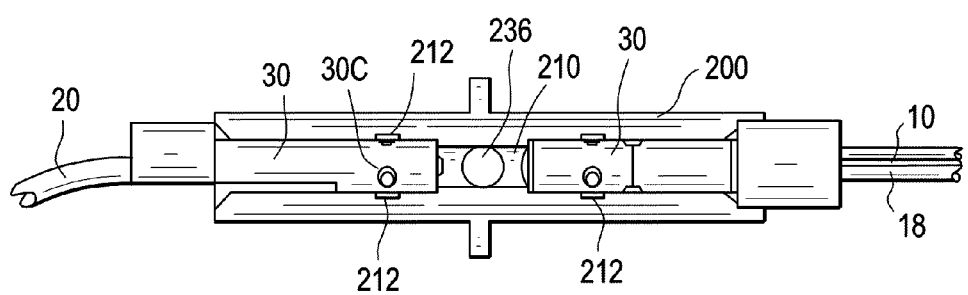
FIG. 16 illustrates two ferrules used in conjunction with a ferrule connector to provide optical coupling between two fibers, according to another embodiment of the present invention.

In another exemplary embodiment, as shown in FIG. 16, the light is provided by the first fiber 10 to the optically transparent window 36A of the first ferrule 30. The optically transparent window 36A of the first ferrule transmits the light to a lens 236 situated inside the ferrule connector 200, between the two ferrules. Lens 236 intercepts the light and focuses it through the optical transparent window 36A of the second ferrule on the endface of the second fiber 10 which is situated in the second ferrule 30. Accordingly the light is coupled from the first fiber to the second fiber via at least one lens component. 236. The ferrules are kept in optical alignment with one another by a retaining device such as a ferrule connector 200. The ferrule connector 200 has an internal bore (mating receptacle) 210 for receiving the ferrules and situating them in optical alignment with one another. The internal bore 210 may have mating structures 212 for engaging and securely holding the ferrules 30 inside the ferrule connector 200. Lens component 236 may be an integral part of the connector 200. Of course, two or more lens components may also be utilized instead of a single lens component 236 as an integral part of connector 200.

Other embodiments are possible in which the two ferrules 30 are not identical to each other, for example optical component 36 in one ferrule may be an optically transparent window 36A and optical component 36 of the other ferrule may be a lens 36B. Furthermore, the ferrules 30 may have differently sized bores to accommodate differently sized fiber/buffer assemblies.

An exemplary optical design for the lens system is presented in the following. The design provides elements for three types of connection, namely coupling an optical source (transmitter) to an optical fiber, coupling an optical fiber to a photodetector (receiver), and coupling a first optical fiber to a second optical fiber. Although in principle one could design a ferrule for each of the said types of connection, it is desirable to use a single ferrule design for all three types of connections. This is advantageously accomplished in the exemplary design presented here. More specifically FIG. 17 illustrates a source 125A, which can be a light emitting diode (LED) or a laser such as for example a Vertical Cavity Surface Emitting Laser (VCSEL), a lens 130, a ferrule 30 with a lens 36B, and a buffer/fiber layer assembly 20 comprising an optical fiber 10 and a buffer 18. The light from the source 125A impinges lens 130 which collimates it and provides it to lens 36B, which focuses it on the endface of optical fiber 10 of fiber/buffer assembly 20. Thus the light from the optical source 125A is coupled to the optical fiber 10. Optional index-matching material may be present within ferrule 30, for example at least between the fiber 10 and lens 36B. A similar design can also be used to provide the light from a fiber to a photodetector 125B. The fiber 10 provides the light to lens 36B, which collimates the light and provides it to lens 130. The lens 130 then focuses the light on the photodetector 125B.

Example

This design is optimized for an operating wavelength of approximately 665 nm, however the same principle can also be employed at different wavelengths, by a suitable choice of materials and components.

In the first type of connection, namely from an optical source to an optical fiber, the optical source can be a Vettical-Cavity Surface-Emitting Laser, emitting at a wavelength of approximately 665 nm, such as, for example, Firecomms model RVM665T-100 manufactured by Firecomms Ltd. The optical source may have a lateral dimension (diameter or side) of the emitting aperture not exceeding 20 m, and a divergence half-angle not exceeding 25 degrees.

In this embodiment the optical fiber 10 has a silica core with a diameter of 200 μm and has numerical aperture (NA) of 0.37.

The first lens 130, which is part of the optical transmitter, transforms the diverging optical beam emitted by the VCSEL into an essentially collimated beam. The second lens 36B, which is part of the ferrule, focuses the essentially collimated optical beam on the input face of the optical fiber 10, resulting in efficient coupling of the optical radiation emitted from the VCSEL to the optical fiber. The lens material can be, for example, ULTEM 1010, available from Sabic Innovative Plastics, which has a refractive index of 1.653 at the wavelength of 665 nm.

Curved lens surfaces can be spherical, but are preferably aspherical in order to reduce optical aberrations which may result in optical coupling loss. In this embodiment lens surfaces are chosen to be conic aspheres. In the following description, the surfaces of each lens are identified as "first" and "second" relative to the order in which light rays emitted from source 125A encounter each surface.

The details of the optical design are as follows:

| Parameter | Value | Units |
| --- | --- | --- |
| Distance from optical source 125A to first lens 130 | 740 | μm |
| First lens 130 clear aperture diameter | 1600 | μm |
| First lens 130 surface 1 radius of curvature | 550 | μm |
| First lens 130, surface 1 conic constant | −2.34 | |
| First lens 130 surface 2 radius of curvature | Infinity | |
| First lens 130 material refractive index | 1.653 | |
| Thickness of first lens 130 (Distance between vertex of surface 1 and surface 2) | 700 | μm |
| Length of gap between second surface of first lens 130 and vertex of first surface of the second lens 36B | 1000 | μm |
| Refractive index of gap material | 1 (air) | |
| Second lens 36B clear aperture diameter | 1600 | μm |
| Second lens 36B surface 1 radius of curvature | 1000 | μm |
| Second lens 36B surface 1 conic constant | −0.34 | |
| Second lens 36B surface 2 radius of curvature | Infinity | |
| Second lens 36B material refractive index | 1.653 | |
| Thickness of second lens 36B, i.e. distance from vertex of surface 1 to surface 2 | 2500 | μm |
| Length of gap (containing index-matching material) between second surface of second lens 36B and endface of optical fiber 10 | 10 | μm |
| Refractive index of index-matching material | 1.5 | |

Note:
it is noted that the core of fiber 10 can be pure silica, or silica doped with a dopant, such as for example Ge or Al.

The same optical design described above can also be used, in the reverse direction, in the second type of connection, namely to couple an optical fiber to a photodetector. All details may be optionally identical to those listed in the previous table; the distance between the photodetector 125B and the first lens 130 is the same as the distance between the source 125A and the first lens 130.

The photodetector 125B can be a semiconductor photodiode. For data transmission at 1 Gb/s, a photodiode with approximately 400 µm diameter of the active area could be used, such as, for example, Hamamatsu model S5973 manufactured by Hamamatsu Photonics, which has 3-db bandwidth of 1 GHz. If higher bandwidth is needed, a photodiode with a smaller active area can be used. This could result in a small additional loss (reduction in the coupling efficiency) because part of the optical radiation from the fiber will be focused outside of the active area of the photodiode. In the case of the optical design presented here, such additional loss is small for photodiodes with active area diameter of 200 µm or larger. Optical ray-tracing simulations predict that with a photodiode with 200 µm diameter of the active area, the additional power loss is approximately 10%.

Finally, the same ferrule may be bused to realize the third type of connection, i.e. coupling from a first optical fiber to a second optical fiber. In this example, two identical ferrules are used, each with the same characteristics listed in the table above. Also in this example, the optical beam is essentially collimated in the air gap between the two ferrules 30, therefore the optical coupling efficiency is relatively insensitive to the distance between the ferrules. Such distance—measured from the vertex of one ferrule to the vertex of the other ferrule—is preferably between 1 and 2 mm.

One exemplary embodiment of optical fiber 10 includes: (i) a multi-mode silica-based glass core having a diameter between 80-300 µm and an index of refraction n1; (ii) a cladding surrounding the core having a thickness≤20 µm and index of refraction n2<n1, with a difference between indices of refraction between the core and cladding being defined (n1-n2). The cladding includes (a) fluorine doped silica with a relative refractive index delta (%) Δn<0 relative to pure silica; or (b) a polymer with relative refractive index delta<0; (iii) a protective coating having a Young's modulus greater than 700 MPa, a thickness≤15 µm, and an index of refraction n3>n2. Further, optical fiber 10 is situated in the buffer layer 18 as discussed herein.

A more specific variation of optical fiber 10 may include a glass core with a graded index with a 175 µm to 225 µm diameter where the cladding is a fluorinated polymer and has a thickness between 10 µm to 15 µm, and the protective coating having the a thickness of ≤10 µm. Additionally, the buffer layer 18 may have a shore D hardness of at least 60.

One advantage of the disclosed optical fibers is that the protective coating minimizes the fiber movement inside the buffer layer during "rough cutting" and also during subsequent use in the fiber optic connector, due to strong adhesion of the protective coating to both the cladding and the buffer layer. Yet another advantage the optical fibers disclosed is that the protective coating prevents the optical fiber core from moving off-center during "rough cutting", thus minimizing coupling losses when this fiber is coupled to another optical fiber. Yet another advantage of the optical fibers disclosed is that the protective coating also provides protection during handling and storage if the buffer layer 18 is not applied at the same time as the protective coating.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A device, comprising:
   at least one ferrule having a bore, the bore extending from a rear of the ferrule toward a front of the ferrule, wherein the bore is sized to receive a single optical fiber with a glass core, a cladding, a protective layer and a buffer surrounding the fiber cladding at a rear end face of the ferrule and at front end face of the ferrule, wherein said front end of the ferrule includes an optical component.

2. The device of claim 1, wherein said optical component is an optically transparent window or a lens.

3. The device of claim 1, wherein said ferrule further includes an index matching material situated in said bore proximate to said optical component.

4. The device of claim 1, wherein said index matching material is situated at least on one side of said optical component.

5. The device of claim 1, wherein said ferrule further includes at least one fiber securing structure.

6. The device of claim 5 wherein said fiber securing structure includes at least one protrusion applying compressive force and indenting into said buffer.

7. The device of claim 6, wherein said securing structure forms a cavity that is big enough the single optical fiber with a buffer van be pressed or inserted by hand into the securing area.

8. The device of claim 1, wherein said ferrule includes movable split arms.

9. The device of claim 1, wherein said ferrule has an outer surface with mating features structured to engage at least one surface of an active device or of a ferrule connector.

10. The device of claim 1, further including an optically transparent protruding structure situated inside the bore, near the front end of the ferrule.

11. The device of claim 1, further including a protruding structure, and a fiber with the fiber endface situated adjacent to said protruding structure.

12. The device of claim 11, further including an index matching material between said fiber endface situated and said protruding structure.

13. The device of claim 1, wherein (i) said ferrule further comprises ribs situated on a surface of the bore; and/or (ii) comprising a buffered fiber situated in said bore, wherein said ribs contact the buffer.

14. The method of connecting an optical fiber/buffer assembly to an active device or ferrule connector, comprising the steps of:
   (i) inserting the fiber/buffer assembly into a ferrule that includes an optical component, such that the endface of the optical fiber/buffer assembly is situated in adjacent to at least one surface of said optical component, wherein the fiber/buffer assembly includes an optical fiber with a glass core, a cladding surrounding the core, a protective coating thereon, and a buffer situated over said coating;

(ii) inserting the ferrule into the mating receptacle of the active device or of the ferrule connector.

15. The method of claim 14 further comprising the steps of:
(i) cutting or cleaving the optical fiber buffer assembly while the buffer surrounds the optical fiber;
(ii) inserting the fiber/buffer assembly into the ferrule such that the cut or cleaved endface of the optical fiber is situated in adjacent to the at least one surface of said optical component.

16. The method of claim 15 further comprising the step of inserting index-matching material into the ferrule so that index-matching material is situated in contact with the endface of the optical fiber.

17. The device of claim 1, wherein said ferrule includes a portion with a U shaped opening.

18. The device of claim 1, further including said single optical fiber, the optical fiber and said fiber forming a fiber/buffer assembly comprising an optical fiber with the glass core having a core diameter of at least 80 microns, a cladding surrounding the core, the protective coating surrounding said cladding, and the buffer is situated over said coating.

19. The device of claim 18, wherein said protective coating has a protective coating having a Young's modulus greater than 700 MPa, a thickness≤15 μm.

20. The device of claim 18, wherein said core is 175 to 220 microns in diameter.

* * * * *